(12) United States Patent
Kamata et al.

(10) Patent No.: US 6,486,225 B1
(45) Date of Patent: Nov. 26, 2002

(54) PHOTOCURABLE COMPOSITION

(75) Inventors: Hirotoshi Kamata, Kanagawa (JP);
Takeo Watanabe, Chiba (JP);
Kazuhiko Ooga, Oita (JP); Toshio Koshikawa, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/441,954

(22) Filed: Nov. 17, 1999

Related U.S. Application Data

(60) Provisional application No. 60/124,664, filed on Mar. 16, 1999.

(30) Foreign Application Priority Data

Nov. 17, 1998  (JP) ............................................. 10-326977
Aug. 5, 1999   (JP) ............................................. 11-221866

(51) Int. Cl.$^7$ ................................ C08F 2/48; C08F 2/50
(52) U.S. Cl. ........................... 522/14; 522/15; 522/16; 522/17; 522/18; 522/20; 522/21; 522/25; 522/26; 522/27; 522/28; 522/29; 522/75; 522/77; 522/79; 522/81; 522/83; 522/90; 522/92; 522/96; 522/100; 522/103; 522/172; 524/701; 524/718
(58) Field of Search ................................ 524/701, 718; 430/2; 522/14, 81, 15, 83, 16, 90, 18, 92, 25, 96, 26, 100, 28, 75, 103, 172, 17, 20, 21, 27, 29, 77, 79

(56) References Cited

U.S. PATENT DOCUMENTS 4,415,603 A  * 11/1983  Valiot et al. ................ 427/54.1
5,124,235 A  *  6/1992  Fukui et al. ................. 430/281
5,952,152 A  *  9/1999  Cunningham et al. ... 430/281.1
6,211,260 B1 *  4/2001  Nakumara et al. ............. 522/14

FOREIGN PATENT DOCUMENTS

EP   0 389 067 A2   9/1990
EP   0 438 123 A2   7/1991
JP   4023117 A  *   9/1996

OTHER PUBLICATIONS

Patent abstracts of Japan vol. 1998, No. 12, Oct. 31, 1998 for JP 10 195119 A.

* cited by examiner

*Primary Examiner*—Judy M. Reddick
(74) *Attorney, Agent, or Firm*—Sughrue Mion, PLLC

(57) ABSTRACT

A photocurable composition comprising (A) 100 parts by weight of a compound having an ethylenically unsaturated group, (B) from 0.001 to 5 parts by weight of a cationic dye having an absorption maximum wavelength in the wavelength region of from 400 to 1,200 nm represented by formula (1:

$$D^+ \cdot A_1^- \tag{1}$$

wherein $D^+$ represents a cation having an absorption maximum wavelength in the wavelength region of from 400 to 1,200 nm, and $A_1{}^{31}$ represents an anion, and (C) from 0.005 to 10 parts by weight of a quaternary borate-type compound represented by formula (2):

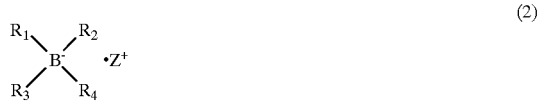

wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents a cation, wherein from 5 to 95 wt % of (A) the compound having an ethylenically unsaturated group is a urethane (meth)acrylate oligomer obtained by the reaction of a polyisocyanate having three or more isocyanate groups within one molecule with a hydroxyl group-containing (meth)acrylic acid ester.

12 Claims, No Drawings

PHOTOCURABLE COMPOSITION

CROSS REFERENCE TO RELATED APPLICATIONS

This application is an application filed under 35 U.S.C. §111(a) claiming benefit pursuant to 35 U.S.C. §119(e) (i) of the filing date of Provisional Application No. 60/124,664 filed Mar. 16, 1999 pursuant to 35 U.S.C. §111(b).

FIELD OF THE INVENTION

The present invention relates to a photocurable composition, more specifically, the present invention relates to a photocurable composition capable of completely curing through the interior of the composition even when the composition contains a pigment or color dye having high hiding power, has a large thickness or contains a material having poor light transmittance.

BACKGROUND OF THE INVENTION

In recent years, from the standpoint of quick curability, cold curability, employing a solventless system and energy savings, radial photopolymerization and cationic photopolymerization are being noticed and are being used in diversified uses such as printed board fabrication, resist or photomask formation, wood painting, optical fiber coating, hard coating on plastics or can coating.

At present, photocuring is dominated by ultraviolet curing where a polymerizable monomer is abruptly cured by irradiation with an ultraviolet ray of from 200 to 400 nm. However, an ultraviolet ray of 400 nm or less is poorly transmitted into a material and has a problem in that in the case of a composition containing a color pigment or color dye in a high concentration, the surface thereof is cured but the interior is not satisfactorily cured. Even a transparent system free of pigment, color dye or the like has a similar problem in that when the curing system has a large thickness or contains a material having poor ultraviolet transmittance, the interior of the curing system is not satisfactorily cured.

In order to solve this problem, JP-B-63-40799 (the term "JP-B" as used herein means an "examined Japanese patent publication") discloses an acylphosphine oxide-type initiator and JP-A-6-298818 (the term "JP-A" as used herein means an "unexamined published Japanese patent application") discloses a bisacylphosphine oxide-type initiator. These photopolymerization initiators can be decomposed not only by an ultraviolet ray of 400 nm or less but also by a visible light of from 400 to 450 nm to generate radicals, therefore, a relatively large thickness can be obtained after curing even if the composition contains a material having poor ultraviolet transmittance, however, the thickness is still not sufficiently large. Furthermore, the initiators are disadvantageous in that depending on the hue of the color pigment present in the composition, the thickness after the curing greatly varies.

JP-A-6-75374 and JP-A-10-81838 disclose a photocurable composition containing a color pigment, where a radical photopolymerization initiator comprising a near infrared absorbing cationic dye or visible light absorbing cationic dye and an organic borate-type sensitizer are added to increase internal curability. By using this composition, a sufficiently large thickness may be cured but the greater part of radicals generated from the organic borate-type sensitizer are consumed in a decolorization reaction of the cationic dye and the absolute amount of radicals participating in the polymerization is small. As result, the degree of curing of the cured product is disadvantageously deficient.

JP-A-10-195119 discloses a photopolymerizable composition comprising (a) a compound having a urethane skeleton within the molecule, which is an addition polymerizable compound having at least one ethylenic double bond, (b1) a dye cation and (b2) a borate anion represented by a specific formula. JP-A-3-111402 discloses a near infrared photopolymerization initiator comprising a dye cation and a borate anion and JP-A-5-194619 discloses a near infrared photopolymerization initiator comprising a dye cation compound and a borate anion compound, in which examples of the urethane acrylate containing such a near infrared photopolymerization initiator (a compound having a double bond and a urethane bond within the molecule) are described but none of them provides satisfactory cured thickness and degree of curing.

SUMMARY OF THE INVENTION

An object of the present invention is to provide a photocurable composition suitable for use in the field of coating material, adhesive, pressure sensitive adhesive, ink, a hologram material and the like, the photocurable composition being sufficiently curable through the interior of the composition even in a curing system containing a coloring material having hiding power, such as a color pigment or a color dye, or containing a material having a low ultraviolet transmittance, which system is heretofore difficult to photocure.

In order to solve this problem, the present inventors have made extensive investigations on a photocurable composition using a combination of a cationic dye having an absorption maximum wavelength in the wavelength region of from 400 to 1,200 nm and a quaternary borate-type compound as a sensitizer thereof and have found that when a specific urethane (meth)acrylate oligomer is used as the radical polymerizing component, the photocurable composition obtained can provide a sufficiently large cured thickness and a high curing degree even when the composition contains a color pigment or color dye having hiding power. The present invention has been accomplished based on this finding.

More specifically, the present invention provides:

1) a photocurable composition comprising (A) 100 parts by weight of a compound having an ethylenically unsaturated group, (B) from 0.001 to 5 parts by weight of a cationic dye having an absorption maximum wavelength in the wavelength region of from 400 to 1,200 nm, represented by formula (1):

$$D^+ \cdot A_1^- \qquad (1)$$

wherein $D^+$ represents a cation having an absorption maximum wavelength in the wavelength region of from 400 to 1,200 nm, and $A_1^-$ represents an anion and (C) from 0.005 to 10 parts by weight of a quaternary borate-type compound represented by formula (2):

wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents a cation, wherein from 5 to 95 wt % of (A) the compound having an ethylenically unsaturated group is a urethane (meth)acrylate oligomer obtained by the reaction of a polyisocyanate having three or more isocyanate groups within one molecule with a hydroxyl group-containing (meth)acrylic acid ester;

2) the photocurable composition as described in 1) above, wherein from 3 to 40 wt % of the compound having an ethylenically unsaturated group is occupied by an N-vinylamide-type compound;

3) the photocurable composition as described in 2) above, wherein the N-vinylamide-type compound is one or more compound selected from the group consisting of N-vinylformamide, N-vinylacetamide and N-methyl-N-vinylacetamide;

4) the photocurable composition as described in 1) to 3) above, wherein the cation ($D^+$) having an absorption in the region of from 400 to 1,200 nm is one or more compound selected from the group consisting of polymethine-, xanthene-, acridine-, azine-, oxazine-, thiazine-, diarylmethane- and triarylmethane-type compounds;

5) the photocurable composition as described in 4) above, wherein the polymethine compound is a compound represented by formula (3):

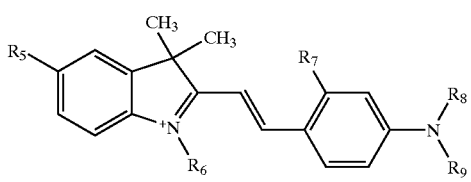

(3)

wherein $R_5$, $R_6$, $R_7$, $R_8$ and $R_9$ each independently represents a hydrogen atom, an alkyl group, an aryl group or a halogen atom;

6) the photocurable composition as described in 1) to 5) above, which further contains from 0.1 to 10 parts by weight of an ultraviolet radical photopolymerization initiator capable of generating a radical by absorbing light at a wavelength of from 200 to 400 nm;

7) the photocurable composition as described in 1) to 6) above, wherein the polyisocyanate having three or more isocyanate groups within one molecule is one or more compound selected from the group consisting of an isocyanurate form of diisocyanate, a biuret form of a diisocyanate and an adduct form of a diisocyanate with a polyol;

8) the photocurable composition as described in 7) above, wherein the diisocyanate is one or more compound selected from the group consisting of aliphatic diisocyanate and alicyclic diisocyanate; and 9) the photocurable composition as described in 1) to 6) above, wherein the polyisocyanate having three or more isocyanate groups within one molecule is a triisocyanate monomer.

DETAILED DESCRIPTION OF THE INVENTION

The present invention is described in detail below.

The photocurable composition of the present invention is a composition which can provide a photocured product sufficiently cured in the thickness direction and having an excellent degree of curing by the irradiation of light having a wavelength agreeing with the absorption wavelength of the cationic dye even when the composition contains a color pigment or color dye having hiding power. In the photocurable composition of the present invention, an ultraviolet radical photopolymerization initiator capable of generating a radical by absorbing light of from 200 to 400 nm is preferably used in combination, so that the composition surface which is difficult to cure in air by a cationic dye/quaternary borate compound-type photopolymerization initiator can also be cured. Incidentally, the term "(meth)acry-" includes both "methacry-" and "acry-" moieties.

The urethane (meth)acrylate oligomer for use in the present invention is obtained by reacting a polyisocyanate having three or more isocyanate groups within one molecule with a hydroxyl group-containing (meth)acrylic acid ester, is photocured at a very high speed and can attain a sufficiently high curing degree even when a radical photopolymerization initiator comprising a cationic dye/quaternary borate-type compound incapable of generating a large amount of radicals is used.

Examples of polyisocyanates having three or more isocyanate groups within one molecule for use in the present invention include an isocyanurate form of diisocyanate, a biuret form of a diisocyanate and an adduct form of a diisocyanate with polyol.

The isocyanurate form of diisocyanate is a compound obtained by trimerizing a diisocyanate compound in the presence of a cyclic trimerizing catalyst. Examples of the cyclic trimerizing catalyst include tertiary amines such as N,N',N"-tris(dimethylaminoalkyl)hexahydrotriazine, 2,4,6-tris(dimethylaminomethyl)phenol, triethylamine and 1,4-diazabicyclo[2.2.2]octane, carboxylates such as potassium acetate, lead 2-ethylhexanoate, sodium benzoate and potassium naphthenate, tertiary alkylphosphines such as tributylphosphine, and alkali metal salts of imides such as potassium phthalimide. The structure of the compound is shown by formula (4):

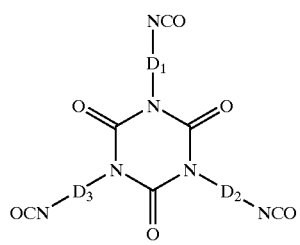

(4)

wherein $D_1$, $D_2$ and $D_3$ each represents an organic group without a group reactive with the isocyanate group and obtained by eliminating two isocyanate groups from a diisocyanate.

The biuret form of diisocyanate is a reaction product between 1 mol of water molecule and 3 mol of diisocyanate. The structure thereof is represented by formula (5):

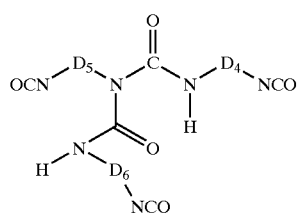

(5)

wherein $D_4$, $D_5$ and $D_6$ each independently represents an organic group without a group reactive with the isocyanate group and obtained by eliminating two isocyanate groups from diisocyanate.

The adduct form of diisocyanate with a polyol is obtained by the reaction with a triol such as trimethylol propane or glycerin, or a tetraol such as pentaerythritol, at a NCO/OH equivalent ratio of 2/1 or more. The structure thereof is represented by, in the case where the polyol is a triol, formula (6) and in the case of a tetraol, formula (7):

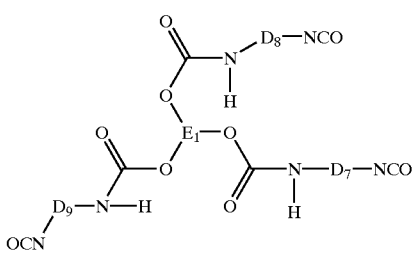

(6)

wherein $D_7$, $D_8$ and $D_9$ each independently represents an organic group without a group reactive with the isocyanate group and obtained by eliminating two isocyanate groups from diisocyanate, and $E_1$ represents a trivalent organic group having from 3 to 10 carbon atoms obtained by eliminating a hydroxyl group from triol;

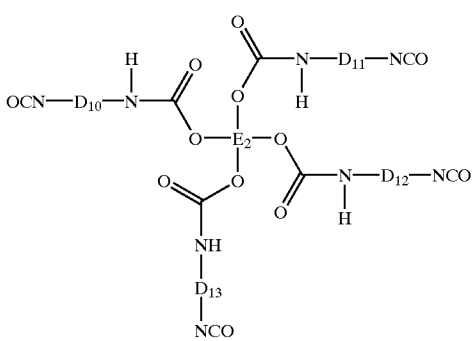

(7)

wherein $D_{10}$, $D_{11}$, $D_{12}$ and $D_{13}$ each independently represents an organic group without a group reactive with the isocyanate group and obtained by eliminating two isocyanate groups from diisocyanate, and $E_2$ represents a tetravalent organic group having from 3 to 10 carbon atoms obtained by eliminating a hydroxyl group from a tetraol.

Specific examples of the diisocyanate as a starting material of the polyisocyanate having three or more isocyanate groups within one molecule include 2,4-tolylene diisocyanate, 2,6-tolylene diisocyanate, 1,3-xylylene diisocyanate, 1,4-xylylene diisocyanate, diphenylmethane-4,4'-diisocyanate, diphenylmethane-2,4'-diisocyanate, 1,5-naphthalene diisocyanate, tolidine diisocyanate, tetramethylxylene diisocyanate, and adduct forms obtained by the excess equivalent reaction of a low molecular weight diol such as ethylene glycol, diethylene glycol, propylene glycol, dipropylene glycol or 1,3-butanediol, with the above-described diisocyanate.

However, in the present invention, an aliphatic diisocyanate such as hexamethylene diisocyanate and lysine diisocyanate, an alicyclic diisocyanate such as isophorone diisocyanate, dicyclohexylmethane-4,4'-diisocyanate, dicyclohexylmethane-2,4'-diisocyanate and ω,ω'-diisocyanate dimethylcyclohexane, and an adduct form obtained by the excess equivalent reaction of the above-described low molecular weight diol with such an aliphatic or alicyclic diisocyanate are preferred because these reduce the viscosity of the urethane (meth)acrylate oligomer for use in the present invention to bring good workability.

The polyisocyanate as a starting material of the urethane (meth)acrylate oligomer for use in the present invention may be a monomer triisocyanate. The monomer triisocyanate may be an aromatic monomer triisocyanate such as triphenylmethane triisocyanate and tris(isocyanatophenyl) thiophosphate, however, in the present invention, an aliphatic monomer triisocyanate such as lysine ester triisocyanate, 1,6,11-undecane triisocyanate, 1,3,6-hexamethylene triisocyanate and 1,8-diisocyanato-4-isocyanatomethyloctane, and an alicyclic monomer triisocyanate such as bicycloheptane triisocyanate are preferred because these reduce the viscosity of the urethane (meth) acrylate oligomer to bring good workability.

Specific examples of hydroxyl group-containing (meth) acrylic acid esters for use in the present invention include 2-hydroxyethyl (meth)acrylate, 2-hydroypropyl (meth)acrylate, 2-hydroxybutyl (meth)acrylate, 4-hydroxybutyl (meth)acrylate, 4-hydoxycyclohexyl (meth)acrylate, 2-hydroxy-3-phenyloxypropyl (meth)acrylate, 3-chloro-2-hydroxybutyl (meth)acrylate, polyethylene glycol mono (meth)acrylate, polypropylene glycol mono(meth)acrylate, caprolatone-modified hydroxyethyl (meth)acrylate, glycerin mono(meth)acrylate, glycerin di(meth)acrylate, glycerin acrylate methacrylate, pentaerythritol tri(meth)acrylate, mono(meth)acrylic acid ester of a diol comprising a phthalic acid anhydride and ethylene glycol condensate, and mono (meth)acrylic acid ester of a diol comprising a phthalic acid anhydride and propylene glycol condensate. Among these, compounds containing an acryloyl group having a high photocuring rate are particularly preferred in the present invention.

In the synthesis of the urethane (meth)acrylate oligomer of the photocurable composition of the present invention, the polyisocyanate having three or more isocyanate groups within one molecule and the hydroxyl group-containing (meth)acrylic acid ester are preferably reacted at an NCO/OH equivalent ratio of from 1.0/0.9 to 1.0/10, more preferably from 1.0/0.95 to 1.0/5.0. If the NCO/OH equivalent ratio exceeds 1.0/0.9, the storage stability deteriorates due to the remaining isocyanate group, whereas if it is less than 1.0/10, the hydroxyl group-containing (meth)acrylic acid ester remains in an excessively large amount and photocurability may decrease. Thus, either case is not preferred.

The reaction for synthesizing the urethane (meth)acrylate oligomer is usually performed at a temperature of from 20 to 100° C. preferably from 40 to 80° C. If the temperature is too high, the (meth)acryloyl group may be disadvantageously polymerized. A solvent does not need to be used, however, in the case of using a solvent, a solvent inert to the isocyanate group may be used. Examples of suitable solvents include ketone-type solvents such as acetone, methyl ethyl ketone and methyl isobutyl ketone, acetic acid ester-type solvents such as ethyl acetate and butyl acetate, aromatic solvents such as toluene and xylene, and (meth)acrylic acid ester-type monomers having no active hydrogen. These solvents may be used individually or as a combination of two or more thereof. At the reaction, a catalyst may also be present. Examples of the catalyst include known urethane bond-forming catalysts such as tertiary amines (e.g., triethylamine, triethylenediamine) and organic tin compounds (e.g., dibutyltin dilaurate, tin octylate).

In the photocurable composition of the present invention, an N-vinylamide-type compound is preferably blended so as to further increase the photocuring rate on the surface and in the inside of the composition. A N-vinylamide-type compound is a compound where a vinyl group is directly bonded to the nitrogen atom of the amide group. The N-vinylamide-type compound is a suitable compound for the photocurable composition of the present invention because of its properties such that the copolymerization rate with a (meth) acryloyl group is high and polymerization inhibition due to oxygen, peculiar to radical polymerization of an ethylenically unsaturated bond, is relatively difficult to occur, thereby markedly improving the photocuring rate. Specific examples of N-vinylamide-type compounds include N-vinylpyrrolidone, N-vinylcaprolactam, N-vinylformamide, N-methyl-N-vinylformamide, N-vinylacetamide and N-methyl-N-vinylacetamide. Among these, N-vinylformamide, N-vinylacetamide and N-methyl-N-vinylacetamide have high safety and provide a photocured product having a high-quality appearance. Therefore, these are particularly preferred for the photocurable composition of the present invention.

In the photocurable composition of the present invention, a monomer or oligomer having an ethylenically unsaturated group may be blended in addition to the urethane (meth) acrylate oligomer produced from the polyisocyanate having three or more isocyanate groups within one molecule and the hydroxyl group-containing (meth)acrylic acid ester, and the N-vinylamide-type compound.

The monomer having an ethylenically unsaturated group is classified into a monofunctional monomer having one unsaturated group in the molecule and a polyfunctional monomer having two or more unsaturated groups. In the present invention, the monofunctional monomer is blended mainly for reducing the viscosity of the composition and thereby improving the coatability and workability. The polyfunctional monomer is blended, in a similar manner to the monofunctional monomer, mainly for reducing the viscosity of the composition and thereby improving the workability and additionally for improving the curability. The oligomer is a compound having generally two or more ethylenically unsaturated groups within one molecule and having an effect of governing various physical properties of the cured coating obtained by the radical polymerization, such as strength, elongation and abrasion resistance.

Specific examples of monofunctional monomers for use in the present invention include n-hexyl (meth)acrylate, 2-ethylhexyl (meth)acrylate, decyl (meth)acrylate, isodecyl (meth)acrylate, lauryl (meth)acrylate, butoxyethyl (meth) acrylate, cyclohexyl (meth)acrylate, 4-tert-butylcyclohexyl (meth)acrylate, dicyclopentanyl (meth)acrylate, dicyclopentenyl (meth)acrylate, isobornyl (meth)acrylate, ethoxydiethylene glycol (meth)acrylate, methoxytriethylene glycol (meth)acrylate, methoxydipropylene glycol (meth)acrylate, phenoxyethyl (meth)acrylate, 2-hydroxy-3-phenoxypropyl (meth)acrylate, phenoxydiethylene glycol (meth)acrylate, N-acryloylmorpholine and tetrahydrofurfuryl (meth) acrylate, hydroxyl group-containing monomers such as 2-hydroxyethyl (meth)acrylate and 2-hydroxypropyl (meth) acrylate, amino group-containing monomers such as N,N-dimethylaminoethyl (meth)acrylate and N,N-dimethylaminopropyl (meth)acrylamide, acidic group-containing monomers such as (meth)acrylic acid, 2-(meth) acryloyloxyethylsuccinic acid, 2-(meth) acryloyloxyethylphthalic acid and 2-acryloyloxyethyl acid phosphate, and hydrolyzable silyl group-containing monomers such as γ-methacryloyloxypropyltrimethoxysilane and vinyltriethoxysilane.

Specific examples of polyfunctional monomers include diethylene glycol di(meth)acrylate, triethylene glycol di(meth)acrylate, tripropylene glycol di(meth)acrylate, polyethylene glycol di(meth)acrylate, 1,3-butanediol di(meth)acrylate, 1,4-butanediol di(meth)acrylate, neopentyl glycol di(meth)acrylate, 1,6-hexanediol di(meth) acrylate, 1,9-nonanediol di(meth)acrylate, trimethylolpropane tri(meth)acrylate, ethylene oxide-modified trimethylolpropane triacrylate, propylene oxide-modified trimethylolpropane tri(meth)acrylate, pentaerythritol tri (meth)acrylate and pentaerythritol tetra (meth)acrylate. More specific examples thereof include those described in *UV·EB Koka Gijutsu no O'yo to Shijo* (*Application and Market of UV·EB Curing Technology*), pp. 12–14 and pp. 20–31, CMC (1989).

Specific examples of oligomers having an ethylenically unsaturated group, which can be used in the present invention, include epoxy (meth)acrylate, polyester (meth) acrylate, polybutadiene (meth)acrylate, silicone (meth) acrylate and unsaturated polyester resin. Also, urethane (meth)acrylate synthesized from diisocyanate/diol/hydroxyl group-containing (meth)acrylic acid ester may be used.

In the photocurable composition of the present invention, the urethane (meth)acrylate oligomer synthesized from the polyisocyanate having three or more isocyanate groups and the hydroxyl group-containing (meth)acrylic acid ester is present in an amount of from 5 to 95 wt %, preferably from 10 to 80 wt %, based on the compound having an ethylenically unsaturated group, so that the object of the present invention can be attained. If the amount is less than 5 wt %, sufficiently high photocurability may not be obtained, whereas if it exceeds 95 wt %, the viscosity of the composition increases excessively and the composition becomes very difficult to coat.

In the photocurable composition of the present invention, the N-vinylamide-type compound is preferably present in an amount of from 3 to 40 wt %, more preferably from 5 to 30 wt %, based on the compound having an ethylenically unsaturated group, so that the object of the present invention can be attained. If the amount is less than 3 wt %, the effect of N-vinylamide-type compound cannot be satisfactorily achieved, whereas if it exceeds 40 wt %, the concentration of monofunctional monomer increases and the photocuring rate may rather decrease, thus, either case is not preferred.

The photopolymerization initiating component in the photocurable composition of the present invention is described below. When the cationic dye represented by formula (1) and the quaternary borate-type compound represented by formula (2) constituting the present invention are combined, decomposition takes place by light at a wavelength of from 400 to 1,200 nm, whereby the cationic dye is decolored and at the same time, polymerization is initiated. If the quaternary borate-type compound is not present together, the decolorization reaction of the cationic dye may not proceed satisfactorily or the polymerization reaction may not take place. However, when the quaternary borate-type compound for use in the present invention is allowed to be present together, the decolorization reaction of the cationic dye perfectly proceeds and the polymerization initiating reaction occurs. Furthermore, when a polymerization accelerator is present, the polymerization initiating reaction proceeds more efficiently. Examples of polymerization accelerators include compounds which accept an electron from a dye radical generated on irradiation of light at a wavelength of from 400 to 1,200 nm and generate a radical, and which can remarkably improve the internal curability of the cured product. Specific examples of polymerization accelerators include organic peroxides, diaryliodonium salts, triarylsulfonium salts, N-alkoxypyridinium salts, triazine compounds having a trihalomethyl group, and sulfone halogenide compounds.

The cationic dye in formula (1) for use in the present invention is a compound having an absorption maximum wavelength in the wavelength region of from 400 to 1,200 nm. The absorption maximum wavelength can be determined by dissolving a cationic dye in a solvent such as water, methanol, ethanol, toluene, xylene, acetone, methyl ethyl ketone, ethyl acetate, n-butyl acetate, N,N-dimethylformamide, N-methyl-2-pyrrolidone, chloroform, methylene chloride, acetonitrile or dimethyl sulfoxide, and measuring the absorption spectrum of the compound using a commonly used spectrophotometer capable of measuring the absorption spectrum in the region of from ultraviolet ray to near infrared ray (for example, Ubest V-570 manufactured by JASCO Corporation or UV-3100 manufactured by Shimadzu Corporation). The method of determining the absorption maximum wavelength is, however, not limited thereto.

Examples of preferred cationic dyes include polymethine-type compounds, xanthene-type compounds, triarylmethane-type compounds, diarylmethane-type compounds, acridine-type compounds, azine-type compounds, oxazine-type compounds and thiazine-type compounds. Specific examples thereof are shown in Table 1.

Among these, polymethine-type and triarylmethane-type compounds are superior in view of the polymerization initiating ability and the decolorizing ability, accordingly, suitably used in the present invention. In particular, polymethine-type compounds having a structure of formula (3) are excellent in those properties.

In formula (3), $R_5$, $R_6$, $R_7$, $R_8$ and $R_9$ each independently represents a hydrogen atom, an alkyl group, an aryl group or a halogen atom. The alkyl group and the aryl group each may have a substituent. Specific examples of substituents include a methyl group, an ethyl group, a n-propyl group, an isopropyl group, a n-butyl group, a sec-butyl group, an isobutyl group, a tert-butyl group, a n-octyl group, a n-dodecyl group, a cyclohexyl group, a phenyl group, a tolyl group, an anisyl group, a naphthyl group, a benzyl group, a phenethyl group, a methoxy group, an ethoxy group, a n-propoxy group, an isopropoxy group, a n-butoxy group, a sec-butoxy group, a tert-butoxy group, a phenoxy group, a naphthoxy group, a benzyloxy group, a hydroxy group and a cyano group.

TABLE 1

Representative Examples of Cationic Dye ($D^+ \cdot A_1^-$)

| No. | $D^+$ | $A_1^-$ | Absorption Maximum Wavelength (Kind of Solvent Measured) |
|---|---|---|---|
| 1 | (structure) | perchlorate anion | 522 nm (acetonitrile) |
| 2 | (structure) | iodide anion | 528 nm (ethanol) |
| 3 | (structure) | chloride anion | 527 nm (acetonitrile) |
| 4 | (structure) | chloride anion | 534 nm (acetonitrile) |

TABLE 1-continued

Representative Examples of Cationic Dye ($D^+ \cdot A_1^-$)

| No. | $D^+$ | $A_1^-$ | Absorption Maximum Wavelength (Kind of Solvent Measured) |
|---|---|---|---|
| 5 | (structure) | 1-naphthalene sulfonate anion | 543 nm (acetonitrile) |
| 6 | (structure) | chloride anion | 544 nm (acetonitrile) |
| 7 | (structure) | tetraphenyl borate | 549 nm (acetonitrile) |
| 8 | (structure) | chloride anion | 559 nm (acetonitrile) |
| 9 | (structure) | chloride anion | 560 nm (acetonitrile) |
| 10 | (structure) | n-butyl triphenyl borate | 822 nm (acetonitrile) |

TABLE 1-continued

Representative Examples of Cationic Dye ($D^+ \cdot A_1^-$)

| No. | $D^+$ | $A_1^-$ | Absorption Maximum Wavelength (Kind of Solvent Measured) |
|---|---|---|---|
| 11 | *[structure: bis-quinolinium pentamethine cyanine with N-C₂H₅ groups]* | p-toluene sulfonate anion | 820 nm (acetonitrile) |
| 12 | *[structure: bis(4-diethylaminophenyl) pentadienylidene dye with phenyl substituents]* | p-toluene sulfonate anion | 830 nm (acetonitrile) |
| 13 | *[structure: Rhodamine B type xanthene dye with diethylamino groups and COOH substituent]* | chloride anion | 552 nm (ethanol) |
| 14 | *[structure: phenazinium dye with CH₃, NH₂ substituents and N-phenyl group]* | chloride anion | 528 nm (chloroform) |
| 15 | *[structure: Crystal violet type triphenylmethane dye with three N(CH₃)₂ groups]* | tetraphenyl borate | 589 nm (acetonitrile) |

TABLE 1-continued

Representative Examples of Cationic Dye ($D^+ \cdot A_1^-$)

| No. | $D^+$ | $A_1^-$ | Absorption Maximum Wavelength (Kind of Solvent Measured) |
|---|---|---|---|
| 16 | (structure) | chloride anion | 613 nm (acetonitrile) |
| 17 | (structure) | chloride anion | 632 nm (acetonitrile) |

The absorption maximum wavelengths shown in Table 1 were determined using an ultraviolet-visible-near infrared spectrophotometer, Ubest V-570, manufactured by JASCO Corporation.

The counter anion ($A_1^-$) in the cationic dye of formula (1) can be any anion and examples thereof include halide anions such as chloride anion, bromide anion and iodide anion, sulfonate anions such as benzenesulfonate anion, p-toluenesulfonate anion, methanesulfonate anion and naphthalenesulfonate anion, borate anions such as tetraphenylborate, tetraanisylborate, n-butyltriphenylborate, n-butyltri(4-tert-butylphenyl)borate, tetrabenzylborate and tetrafluoroborate, and various anions such as $ClO_4^-$, $PF_6^-$ and $SbF_6^-$, however, the present invention is by no means limited thereto.

If desired, two or more of these cationic dyes may be used in any ratio.

The quaternary borate-type compound represented by formula (2) in the photocurable composition of the present invention is constituted by a quaternary organic borate anion and a cation ($Z^+$).

In formula (2), $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents an arbitrary cation. The alkyl group, the aryl group, the aralkyl group, the alkenyl group, the alkynyl group, the silyl group and the heterocyclic group represented by $R_1$, $R_2$, $R_3$ or $R_4$ in formula (2) each may have any substituent. Specific examples of substituents include a methyl group, an ethyl group, a n-propyl group, an isopropyl group, a n-butyl group, a sec-butyl group, an isobutyl group, a tert-butyl group, a n-octyl group, a n-dodecyl group, a cyclopentyl group, a cyclohexyl group, a phenyl group, a tolyl group, a xylyl group, an anisyl group, a biphenyl group, a naphthyl group, a benzyl group, a phenethyl group, a diphenylmethyl group, a methoxy group, an ethoxy group, a n-propoxy group, an isopropoxy group, a n-butoxy group, a sec-butoxy group, a tert-butoxy group, a methylenedioxy group, an ethylenedioxy group, a phenoxy group, a naphthoxy group, a benzyloxy group, a methylthio group, a phenylthio group, a 2-furyl group, a 2-thienyl group, a 2-pyridyl group and a fluoro group, however, the present invention is by no means limited these examples.

Specific examples of quaternary organic borate anions in formula (2) include n-butyltriphenylborate, n-octyltriphenylborate, n-dodecyltriphenylborate, sec-butyltriphenylborate, tert-butyltriphenylborate, benzyltriphenylborate, n-butyltri(p-anisyl)borate, n-octyltri(p-anisyl)borate, n-dodecyltri(p-anisyl)borate, n-butyltri(p-tolyl)borate, n-butyltri(o-tolyl)borate, n-butyltri(4-tert-butylphenyl)borate, n-butyltri(4-fluoro-2-methylphenyl)borate, n-butyltri(4-fluorophenyl)borate, n-butyltri(1-naphthyl)borate, n-butyltri[1-(4-methylnaphthyl)]borate, triphenylsilyltriphenylborate, trimethylsilyltriphenylborate, tetra-n-butylborate, di-n-butyldiphenylborate and tetrabenzylborate. Among these, compounds having a structure such that $R_1$ is an alkyl group and $R_2$, $R_3$ and $R_4$ each is an aryl group are well balanced between the stability and the curability, and suitable for the photocurable composition of the present invention.

Specific examples of $Z^+$ in formula (2) include tetramethylammonium, tetraethylammonium, tetra-n-butylammonium, tetraoctylammonium, N-methylquinolinium, N-ethylquinolinium, N-methylpyridinium, N-ethylpyridinium, tetramethylphosphonium, tetra-n-butylphosphonium, trimethylsulfonium, triphenylsulfonium, trimethylsulfoxonium, diphenyliodonium, di(4-tert-butylphenyl)iodonium, lithium cation and sodium cation.

Any combination of the quaternary organic borate anion and the cation represented by $Z^+$ may be used in the present invention. The present invention is, however, not limited to those examples by any means. The quaternary organic borate-type compounds may be used as a combination of two or more thereof.

The polymerization accelerator which can be used in the present invention is specifically described below. The diaryliodonium salt comprises diaryliodonium cation and an arbitrary anion ($A_2^-$). Specific examples of diaryliodonium cations include diphenyliodonium, p-anisylphenyliodonium, di(4-tert-butylphenyl)iodonium, di(o-tolyl)iodonium and di(3-nitrophenyl)iodonium.

The triarylsulfonium salt comprises triarylsulfonium cation and an arbitrary anion ($A_3^-$). Specific examples of triarylsulfonium cations include triphenylsulfonium, diphenyl(p-anisyl)sulfonium, diphenyl(o-tolyl)sulfonium, diphenyl(4-fluorophenyl)sulfonium, diphenyl[4-(phenylthio)phenyl]sulfonium and diphenyl[4-(diphenylsulfoniumyl)phenyl]sulfonium.

The N-alkoxypyridinium salt comprises N-alkoxypyridinium cation and an arbitrary anion ($A^{4-}$). Specific examples of the N-alkoxypyridinium cation include N-ethoxypyridinium, N-ethoxy-2-picolinium, N-ethoxy-3-picolinium, N-ethoxy-4-picolinium, N-ethoxy-4-phenylpyridinium, N-ethoxy-4-cyanopyridinium and N,N'-diethoxy-4,4'-bipyridinium.

Specific examples of $A_2^-$, $A_3^-$ and $A_4^-$ include $BF_4^-$, $PF_6^-$, $AsF_6^-$, $SbF_6^-$, $ClO_4^-$, $Cl^-$, $Br^-$, tetraphenylborate, tetrakis(pentafluorophenyl)borate, benzenesulfonate anion, p-toluenesulfonate anion and trifluoromethanesulfonate anion. The anion and the diaryliodonium cation, triphenylsulfonium cation or N-alkoxysulfonium cation may be freely combined and used in the present invention.

Specific examples of triazine compounds having a trichloromethyl group include 2,4,6-tris(trichloromethyl)-s-triazine, 2,4,6-tris(tribromomethyl)-s-triazine, 2,4-bis(dichloromethyl)-6-trichloromethyl-s-triazine, 2-(4-chlorophenyl)-4,6-bis(trichloromethyl)-s-triazine, 2,4-bis-(4-methoxyphenyl)-6-trichloromethyl-s-triazine, 2,4-bis(3-chlorophenyl)-6-trichloromethyl-s-triazine, 2-(4-methoxystyryl)-4,6-bis(trichloromethyl)-s-triazine and 2-(4-chlorostyryl)-4,6-bis(trichloromethyl)-s-triazine.

Specific examples of sulfone halogenide compounds include trichloromethylphenylsulfone, tribromomethylphenylsulfone, trichloromethyl-4-chlorophenylsulfone, 2,4-dichlorophenyltrichloromethylsulfone, 2-methyl-4-chlorophenyltrichloromethylsulfone and 2,4-dichlorophenyltribromomethylsulfone.

Specific examples of organic peroxides include benzoyl peroxide, 2,4-dichlorobenzoyl peroxide, tert-butylperoxybenzoate, di(tert-butylperoxy)isophthalate, di(tert-butylperoxy)terephthalate, di(tert-butylperoxy)phthalate, 2,5-dimethyl-2,5-di(benzoylperoxy)hexane and 3,3',4,4'-tetra(tert-butylperoxycarbonyl)benzophenone. These polymerization accelerators may be used as a combination of two or more thereof.

The ultraviolet radical photopolymerization initiator for use in the present invention is used for the purpose of curing the surface layer of the coating in air. The ultraviolet radical photopolymerization initiator used is an ordinary photopolymerization initiator which is excited by irradiation of an ultraviolet ray of 400 nm or less and generates a radical. Such an ultraviolet radical photopolymerization initiator includes the compounds represented by formula (8):

(8)

wherein Ar represents an aryl group, and X represents an alkyl group, an alicyclic group, a benzyl group, an alkoxycarbonyl group, a benzoyl group, an aryl group or a phosphinoyl group having a substituent.

In formula (8), the aryl group represented by Ar may have any substituent. Specific examples of substituents include a methyl group, an ethyl group, a n-propyl group, an isopropyl group, a n-butyl group, a sec-butyl group, an isobutyl group, a tert-butyl group, a n-octyl group, a n-dodecyl group, a cyclohexyl group, a phenyl group, a tolyl group, an anisyl group, a naphthyl group, a benzyl group, a phenethyl group, a methoxy group, an ethoxy group, a n-propoxy group, an isopropoxy group, a n-butoxy group, a sec-butoxy group, a tert-butoxy group, a 2-hydroxyethoxy group, a phenoxy group, a naphthoxy group, a benzyloxy group, a hydroxy group, an acetoxy group, a benzoyloxy group, an acryloyloxy group, a methacryloyloxy group, a carboxyl group, a methoxycarbonyl group, an ethoxycarbonyl group, a benzoyl group, a naphthoyl group, an acetyl group, a propionyl group, a dimethylamino group, a diethylamino group, a morpholino group, a methylthio group, a phenylthio group, a 2-furfuryl group, a 2-thienyl group, a 2-pyridyl group, a 2-quinolinyl group, a fluoro group, a chloro group and a bromo group. However, the present invention is by no means limited to these examples.

In formula (8), the alkyl group, the alicyclic group, the benzyl group, the alkoxycarbonyl group, the benzoyl group and the aryl group represented by X each may have a substituent. Specific examples of substituents include a methyl group, an ethyl group, a n-propyl group, an isopropyl group, a n-butyl group, a sec-butyl group, an isobutyl group, a tert-butyl group, a n-octyl group, a n-dodecyl group, a cyclohexyl group, a phenyl group, a tolyl group, an anisyl group, a naphthyl group, a benzyl group, a phenethyl group, a methoxy group, an ethoxy group, a n-propoxy group, an isopropoxy group, a n-butoxy group, a sec-butoxy group, a tert-butoxy group, a phenoxy group, a naphthoxy group, a benzyloxy group, a hydroxy group, an acetoxy group, a benzoyloxy group, a carboxyl group, a methoxycarbonyl group, an ethoxycarbonyl group, a benzoyl group, a naphthoyl group, an acetyl group, a propionyl group, a dimethylamino group, a diethylamino group, a morpholino group, a methylthio group, a phenylthio group, a 2-furfuryl group, a 2-thienyl group, a 2-pyridyl group, a 2-quinolinyl group, a fluoro group, a chloro group and a bromo group. However, the present invention is by no means limited to these examples.

Specific examples of substituents of the phosphinoyl group having a substituent represented by X in formula (8) include a methyl group, an ethyl group, a n-propyl group, an isopropyl group, a n-butyl group, a sec-butyl group, an isobutyl group, a tert-butyl group, a 2-ethylhexyl group, a n-octyl group, a 2,4,4-trimethylpentyl group, a cyclohexyl group, a phenyl group, a tolyl group, a 2,5-dimethylphenyl group, a mesityl group, a cumenyl group, a benzyl group, a phenethyl group, a benzoyl group, a 2,6-dichlorobenzoyl group, a 2,4,6-trimethylbenzoyl group, a 2,6-dimethoxybenzoyl group, a 2,6-diethoxybenzoyl group and a naphthoyl group. However, the present invention is not limited to these examples by any means.

Specific examples of compounds represented by formula (8) include benzoin-type compounds such as benzoin isobutyl ether, benzoin isopropyl ether, benzoin ethyl ether and benzyl dimethyl ketal, acetophenone-type compounds such as diethoxyacetophenone, 2-hydroxy-2-methyl-1-phenylpropan-1-one, 1-(4-isopropylphenyl)-2-hydroxy-2-methylpropan-1-one, 1-hydroxycyclohexyl phenyl ketone, 4-tert-butyltrichloroacetophenone, 2-methyl-1-[4-(methylthio)phenyl]-2-morpholinopropanone-1 and 2-benzyl-2-dimethylamino-1-(4-morpholinophenyl)-butanone-1, glyoxy ester-type compounds such as methylphenylglyoxylate, benzophenone-type compounds such as benzophenone, methyl benzoylbenzoate, hydroxybenzophenone, 4-phenylbenzophenone and acrylated benzophenone, and acylphosphine oxide-type compounds such as 2,4,6-trimethylbenzoyldiphenylphosphine oxide, and bisacylphosphine oxide-type compounds such as bis(2,6-dimethoxybenzoyl)-2,4,4-trimethylpentylphosphine oxide, bis(2,6-dichlorobenzoyl)phenylphosphine oxide, bis(2,6-dichlorobenzoyl)-2,5-dimethylphenylphosphine oxide and bis(2,4,6-trimethylbenzoyl)phenylphosphine oxide.

Ultraviolet radical photopolymerization initiators having a structure other than formula (8), for example, thioxanthone-type compounds such as 2,4-diethylthioxanthone and 2-isopropylthioxanthone may also be used.

In general, a compound called a P1-type photoinitiator, such as benzoin-type compound, acetophenone-type compound, glyoxy ester-type compound and acylphosphine oxide-type compound, may be used alone by itself. On the other hand, an ultraviolet radial photopolymerization initiator such as a benzophenone-type compound and a thioxanthone-type compound, which is a P2-type photoinitiator, is used in combination with a hydrogen-donating compound. Also in the case of a P1-type photoinitiator, when a hydrogen donator is used in combination, the curability is improved.

The hydrogen-donating compound is a compound capable of donating hydrogen to the initiator excited by light. Examples thereof include aliphatic amines such as triethanolamine and methyldiethanolamine, and aromatic amines such as 2-dimethylaminoethylbenzoic acid, ethyl 4-dimethylaminobenzoate, isobutyl 4-dimethylaminobenzoate and 4,4'-dimethylaminobenzophenone.

These ultraviolet radical photopolymerization initiators may be used either individually or as a combination of two or more thereof.

The amount of the photopolymerization initiator added is described below. The cationic dye represented by formula (1) is used in an amount of from 0.001 to 5 parts by weight, preferably from 0.01 to 2 parts by weight, per 100 parts by weight of the compound having an ethylenically unsaturated group, so that the object of the present invention can be achieved. If the amount added is less than 0.001 parts by weight, polymerization does not proceed satisfactorily and incomplete curing may result, whereas if it exceeds 5 parts by weight, the cured product is colored to impair the hue and moreover, such an amount is disadvantageous in view of profitability.

The quaternary borate-type compound represented by formula (2) is used in an amount of from 0.005 to 10 parts by weight, preferably from 0.05 to 5 parts by weight, per 100 parts by weight of the compound having an ethylenically unsaturated group, so that the object of the present invention can be achieved. If the amount used is less than 0.005 parts by weight, polymerization does not proceed satisfactorily, resulting in a failure to complete curing, and at the same time, the decolorization reaction of the cationic dye does not proceed satisfactorily, resulting in coloration in the cured product. If it exceeds 10 parts by weight, the cured product is deteriorated in the physical properties.

The polymerization accelerator is used in an amount of from 0.005 to 10 parts by weight, preferably from 0.01 to 5 parts by weight, per 100 parts by weight of the compound having an ethylenically unsaturated group, so that the curing acceleration effect can be achieved. If the amount used is less than 0.005 parts by weight, the effect of the polymerization accelerator cannot be fully brought out, whereas if it exceeds 10 parts by weight, the physical properties of the cured product may be deteriorated or the stability of the composition of the present invention may be extremely impaired, thus, these are not preferred.

The ultraviolet radical photopolymerization initiator is generally used in an amount of from 0. 1 to 10 parts by weight, preferably from 0.5 to 5 parts by weight, per 100 parts by weight of the compound having an ethylenically unsaturated group, so that the object of the present invention can be achieved. If the amount used is less than 0.1 parts by weight, curing may not satisfactorily proceed in air, whereas if it exceeds 10 parts by weight, the physical properties of the cured product may be degraded or the cured product is deteriorated by the residual ultraviolet radical photopolymerization initiator and disadvantageously colored yellow.

Depending on the case, the photocurable composition of the present invention may undergo color retrieval of the cationic dye after the photocuring. In such a case, color retrieval of the cationic dye may be prevented by blending one or more compound selected from the group consisting of a compound having a substituent at least at one of the ortho positions to the carbon atom bonded to the phenolic hydroxyl group, an aromatic thiol-type compound, an amine-type compound and a phosphorus-type compound.

Specific examples of the compound having a substituent at least at one of the ortho positions to the carbon atom bonded to the phenolic hydroxyl group include 2,4,6-tri-tert-butylphenol, 2,6-di-tert-butyl-p-cresol, N,N-hexamethylene-bis(3,5-di-tert-butyl-4-hydroxyhydrocinnamide), octadecyl-3-(3,5-di-tert-butyl-4-hydroxyphenyl) propionate, 3,5-di-tert-butyl-4-hydroxybenzyl phosphonate-diethyl ester, 1,3,5-trimethyl-2,4,6-tris(3,5-di-tert-butyl-4-hydroxybenzyl)benzene, 2,2'-methylenebis(4-methyl-6-tert-butylphenol), 4,4'-thiobis(3-methyl-6-tert-butylphenol), 2,4,6-tris-(dimethylaminomethyl)phenol, isooctyl-3-(3,5-di-tert-butyl-4-hydroxyphenyl) propionate, 2-(3,5-di-tert-butyl-2-hydroxyphenyl)-5-chlorobenzotriazole, 2-(3,5-di-tert-amyl-2-hydoxyphenyl)benzotriazole, 2-(3,5,-di-tert-butyl-2-hydroxyphenyl)benzotriazole, 2,4-di-tert-butylphenyl-3,5-di-tert-butyl-4-hydroxybenzoate, p-tert-butylphenyl salicylate, p-octylphenyl salicylate, 2-hydroxy-4-octyloxybenzophenone and 2-hydroxy-4-dodecyloxybenzophenone More specifically, the compounds described in 12695 *no Kagaku Shohin* (12695 *Chemical*

*Products*), pp. 969–973 and pp. 977–981, Kagaku Kogyo Nippo Sha (1995), the compounds described in *Kobunshi Tenkazai no Kaihatsu to Saishin Gijutsu* (*Development and Latest Technology of Polymer Additives*), pp. 37–56, CMC KK (1992), and phenol-type compounds described in Polyfile, Vol. 3, pp. 22–30, Taiseisha (1997) may be used.

Specific examples of aromatic thiol-type compounds include thiophenol, 2-mercaptobenzothiazole, 2-mercaptobenzoxazole, 2-mercaptobenzimidazole, 2-mercaptomethylbenzimidazole, 2,4,6-trimercapto-s-triazine and 2-mercaptoimidazoline.

Examples of amine-type compounds include aliphatic amines such as triethanolamine and tributylamine, and aromatic amines such as N,N-dimethylaniline and N,N-dimethyl-p-toluidine. In particular, hindered amine-type compounds are preferred, such as bis(2,2,6,6-tetramethyl-4-piperidyl) sebacate, bis(1,2,2,6,6-pentamethyl-4-piperidyl) sebacate, 2-(3,5-di-tert-butyl-4-hydroxybenzyl)-2-n-butyl-malonic acid bis(1,2,2,6,6-pentamethyl-4-piperidyl), 4-benzoyloxy-2,2,6,6-tetramethylpiperidine and 8-acetyl-3-dodecyl-7,7,9,9-tetramethyl-1,3,8-trisazaspiro[4,5]decane-2,4-dione. More specifically, the compounds described in *12695 no Kagaku Shohin* (*12695 Chemical Products*), pp. 982–984, Kagaku Kogyo Nippo Sha (1995) may be used.

Specific examples of phosphorus-type compounds include triphenylphosphine, trimethyl phosphite, triethyl phosphite, tributyl phosphite, tridecyl phosphite, triphenyl phosphite, tris(2,4-di-tert-butylphenyl) phosphite, tris(nonylphenyl) phosphite, diphenylisodecyl phosphite, phenyldiisodecyl phosphite and 2,2-methylenebis(4,6-di-tert-butylphenyl)octyl phosphite. More specifically, the compounds described in *Kobunshi Tenkazai no Kaihatsu to Saishin Gijutsu* (*Development and Latest Technology of Polymer Additives*), pp. 60–66, CMC KK (1992) may be used.

Such a compound for preventing color retrieval a cationic dye is generally used in an amount of from 0.05 to 15 parts by weight, preferably from 0.2 to 10 parts by weight, per 100 parts by weight of the compound having an ethylenically unsaturated group, so that the object of preventing color retrieval can be achieved. If the amount added is less than 0.05 parts by weight, it is difficult to completely prevent color retrieval, whereas if it exceeds 15 parts by weight, curability may decrease or the physical properties of the cured product may be disadvantageously deteriorated.

The photocurable composition of the present invention may use one or more coloring agent selected from a color pigment, a color dye and a bright pigment. Examples of color pigments which can be used include white pigments such as titanium white and zinc white, black pigments such as carbon black and titanium black, and other known organic or inorganic pigments described in *Saishin Ganryo Binran* (*Handbook of Latest Pigments*), compiled by Nippon Ganryo Gijutsu Kyokai (1976). Examples of coloring dyes which can be used include known dyes described in *Senryo Binran* (*Handbook of Dyes*), compiled by Yuki Gosei Kagaku Kyokai (The Society of Synthetic Organic Chemistry) (1970). Examples of bright pigments which can be used include aluminum powder, aluminum paste, silver powder, titanium oxide-coated mica and micaceous iron oxide. The coloring agent may be used in an amount of from 0 to 200 parts by weight per 100 parts by weight of the compound having an ethylenically unsaturated bond.

Furthermore, the photocurable composition of the present invention may contain an extender pigment of various kinds. Examples thereof include silica powder, silica-alumina powder, alumina powder, aluminum hydroxide powder, quartz powder, glass powder, calcium carbonate powder, kaolin powder, talc powder, mica powder, aluminum sulfate powder, and those obtained by coating the powder surface with a polyfunctional (meth)acrylate-type monomer or silane coupling agent. Two or more different kinds of extender pigments may be added separately or after mixing those.

The photocurable composition of the present invention may also contain an organic polymer compound so as to prevent curing shrinkage or impart flexibility. The organic polymer compound as used herein means a homopolymer or copolymer of an organic monomer, having a number average molecular weight of 1,000 or more. Examples of organic polymer compounds include polystyrene resin, polyurethane resin, polyvinyl acetal resin, polyvinyl butyral resin, saturated polyester resin, novolak resin, phenol resin, epoxy resin, polyvinylpyrrolidone, chlorinated polyolefin, rubber components such as butadiene rubber, styrene-butadiene rubber, nitrile rubber and acrylic rubber, various thermoplastic elastomers such as polystyrene type, polyolefin type, polydiolefin type, polyurethane type and polyester type, and homopolymers and copolymers of a (meth)acrylic acid alkyl ester, such as polymethyl (meth)acrylate, polyethyl (meth)acrylate and polybutyl (meth)acrylate.

The photocurable composition of the present invention can be used as a solventless-type material and is expected to contribute to the global atmospheric amelioration. Of course, the photocurable composition may be used by diluting it with a solvent as in conventional techniques. The solvent used here may be a solvent heretofore used in coating materials and the like. Examples thereof include aromatic hydrocarbons such as toluene and xylene, alcohols such as ethanol, 2-propanol and 1-butanol, ketones such as acetone, methyl ethyl ketone and methyl isobutyl ketone, ethers such as diethylene glycol dimethyl ether and triethylene glycol diethyl ether, esters such as ethyl acetate, butyl acetate and amyl acetate, and monoethers of ethylene glycol, such as methyl cellosolve and ethyl cellosolve. These solvents may be used individually or in combination of two or more thereof. The organic solvent is generally used so as to reduce the viscosity of the composition and thereby improve workability and adhesion of the composition to the substrate.

The photocurable composition of the present invention may contain a thermal polymerization inhibitor for the purpose of preventing polymerization during the storage. Specific examples of thermal polymerization inhibitors which can be added to the photocurable composition of the present invention include p-methoxyphenol, hydroquinone, alkyl-substituted hydroquinone, catechol, tert-butyl catechol and phenothiazine.

The photocurable composition of the present invention may further contain an antifoggant, a discoloration inhibitor, a fluorescent brightening agent, a surface active agent, a plasticizer, a flame retarder, an antioxidant, an ultraviolet absorbent, a foaming agent, an antifungal, an antistatic agent, a magnetic substance, an electrically conducting material or the like according to the purpose.

Examples of light sources suitable for curing of the photocurable composition of the present invention include high-pressure mercury lamp, extra-high pressure mercury lamp, metal halide lamp, short arc metal halide lamp, xenon lamp, sodium lamp, halogen lamp, incandescent lamp, sun light, semiconductor laser and excimer laser.

The photocurable composition of the present invention may be used, needless to say, as an outer facing or interior finishing paint for buildings, a paint for inorganic materials such as concrete, a coating material for plastics, an adhesive, a pressure-sensitive adhesive or a printing ink, and furthermore, may be used for a photosensitive material such as a hologram or resist material by coating the composition together with a binder and the like on a substrate.

The present invention is described below by referring to the Examples. Of course, the present invention should not be construed as being limited to these Examples. Unless otherwise indicated, are parts, percents and the like are by weight.

EXAMPLES

Synthesis Example 1 of Urethane Acrylate Oligomer

To a reaction vessel with a thermometer, a stirrer, a dropping funnel, a condenser tube and the like, 388 g of SUMIDUR N3500 (trade name, produced by Sumitomo Bayer Urethane Co., Ltd., isocyanurate form of hexamethylene diisocyanate), 325 g of BLENMER AP-400 (trade name, produced by NOF Corporation, polypropylene glycol monoacrylate), 97 g of 2-hydroxyethyl acrylate, 248 g of ARONIX M-305 (trade name, produced by Toagosei Co., Ltd., a 6:4 mixture of pentaerythritol triacrylate: pentaerythritol tetraacrylate) and 0.04 g of hydroquinone methyl ether were charged, and then 0.06 g of dibutyltin dilaurate was charged. Subsequently, the reaction vessel was dipped in a water bath so as to prevent the liquid temperature from increasing in excess of 50° C. and stirred for 4 hours. Thereafter, the water bath was removed and 0.02 g of dibutyltin dilaurate was charged. The liquid temperature was kept at 60° C. using an oil bath and the contents were reacted for 4 hours until the infrared absorption of isocyanate disappeared. After the completion of reaction, the reaction solution was gradually cooled to room temperature. As a result, a urethane acrylate oligomer having a solid content of 100% was obtained as a colorless high viscosity liquid (UA-A).

Synthesis Examples 2 to 11 of Urethane Acrylate Oligomer

Urethane acrylate oligomers (UA-B to UA-K) were obtained by performing thoroughly the same reaction as in Synthesis Example 1 of Urethane Acrylate Oligomer except that the kind and the amount of the hydroxyl group-containing acrylic acid esters and the polyisocyanate charged in the reaction of Synthesis Example 1 of Urethane Acrylate Oligomer were changed as shown in Table 2 below.

Comparative Synthesis Example 1 of Urethane Acrylate Oligomer

To a reaction vessel with a thermometer, a stirrer, a dropping funnel, a condenser tube and the like, 224 g of hexamethylene diisocyanate, 650 g of BLENMER AP-400, 155 g of 2-hydroxyethyl acrylate and 0.04 g of hydroquinone methyl ether were charged as shown in Table 2. Subsequently, 0.06 g of dibutyltin dilaurate was charged and the reaction vessel was dipped in a water bath so as to prevent the liquid temperature from increasing in excess of 50° C. and stirred for 4 hours. Thereafter, the water bath was removed and 0.02 g of dibutyltin dilaurate was charged. The liquid temperature was kept at 60° C. using an oil bath and the contents were reacted until the infrared absorption of isocyanate disappeared. After the completion of reaction, the reaction solution was gradually cooled to room temperature. As a result, a urethane acrylate oligomer (Comparative UA-A) having a solid content of 100% was obtained as a colorless high viscosity liquid.

Comparative Synthesis Example 2 of Urethane Acrylate Oligomer

To a reaction vessel with a thermometer, a stirrer, a dropping funnel, a condenser tube and the like, 224 g of hexamethylene diisocyanate, 459 g of FA2D (trade name, produced by Daicel Chemical Industries, Ltd., caprolactone-modified hydroxyethyl acrylate), 116 g of 2-hydroxyethyl acrylate, 167 g of ARONIX M-305 and 0.04 g of hydroquinone methyl ether were charged as shown in Table 2. Subsequently, 0.06 g of dibutyltin dilaurate was charged and the reaction vessel was dipped in a water bath so as to prevent the liquid temperature from elevating in excess of 50° C. and stirred for 4 hours. Thereafter, the water bath was removed and 0.02 g of dibutyltin dilaurate was charged. The liquid temperature was kept at 60° C. using an oil bath and the contents were reacted for 4 hours until the infrared absorption of isocyanate disappeared. After the completion of reaction, the reaction solution was gradually cooled to room temperature, as a result, a urethane acrylate oligomer (Comparative UA-B) having a solid content of 100% was obtained as a colorless high viscosity liquid.

TABLE 2

Starting Material Composition of Urethane Acrylate Oligomer

| Kind of Polyisocyanate | UA-A | UA-B | UA-C | UA-D | UA-E | UA-F | UA-G | UA-H | UA-I |
|---|---|---|---|---|---|---|---|---|---|
| SUMIDUR N3500 *1 | 388 | 388 | 388 | 388 | 388 | 0 | 0 | 0 | 0 |
| SUMIDUR N3200 *2 | 0 | 0 | 0 | 0 | 0 | 366 | 366 | 0 | 0 |
| SUMIDUR HT *3 | 0 | 0 | 0 | 0 | 0 | 0 | 0 | 648 | 648 |
| Kind of Hydroxyl Group-Containing Acrylate | | | | | | | | | |
| BLENMER AP-400 *4 | 325 | 325 | 488 | 0 | 366 | 488 | 0 | 488 | 0 |
| FA2D *5 | 0 | 0 | 0 | 344 | 258 | 0 | 344 | 0 | 344 |
| 2-Hydroxyethyl acrylate | 97 | 0 | 58 | 58 | 0 | 58 | 58 | 58 | 58 |
| 2-Hydroxypyropyl acrylate | 0 | 111 | 0 | 0 | 0 | 0 | 0 | 0 | 0 |
| ARONIX M-305 *6 | 248 | 248 | 248 | 248 | 248 | 248 | 248 | 248 | 248 |

| Kind of Polyisocyanate | UA-J | UA-K | Comparative UA-A | Comparative UA-B |
|---|---|---|---|---|
| LTI *7 | 180 | 180 | 0 | 0 |
| Hexamethylene diisocyanate | 0 | 0 | 224 | 224 |
| Kind of Hydroxyl Group-Containing Acrylate | | | | |
| BLENMER AP-400 | 325 | 0 | 650 | 0 |
| FA2D | 0 | 344 | 0 | 459 |

TABLE 2-continued

Starting Material Composition of Urethane Acrylate Oligomer

| | | | | | |
|---|---|---|---|---|---|
| 2-Hydroxyethyl acrylate | 97 | 58 | 155 | 116 | |
| 2-Hydroxypropyl acrylate | 0 | 0 | 0 | 0 | |
| ARONIX M-305 | 248 | 248 | 0 | 167 | unit (g) |

*1: trade name, produced by Sumitomo Bayer Urethane Co., Ltd., isocyanurate form of hexamethylene diisocyanate (present trade name: SUMIDUR N3300)
*2: trade name, produced by Sumitomo Bayer Urethane Co., Ltd., biuret form of hexamethylene diisocyanate
*3: trade name, produced by Sumitomo Bayer Urethane Co., Ltd., adduct form of hexamethylene diisocyanate
*4: trade name, produced by NOF Corporation, polypropylene glycol monoacrylate
*5: trade name, produced by Daicel Chemical Industries, Ltd., caprolactone-modified hydroxyethyl acrylate
*6: trade name, produced by Toagosei Co., Ltd., a 6:4 mixture of pentaerythritol triacrylate:pentaerythritol tetraacrylate
*7: trade name, produced by Kyowa Hakko Kogyo Co., Ltd., lysine ester triisocyanate Preparation of White Coating Material Using the urethane acrylate oligomer synthesized above, a diluting monomer, titanium oxide, a dispersant and a defoaming agent, various white coating materials (White Coating Materials 1 to 13 and Comparative White Coating Materials 1 and 2) were prepared to have the composition shown in Table 3 below.

TABLE 3

Composition of Various White Coating Materials

| | Kind and Composition of White Coating Materials | | | | |
|---|---|---|---|---|---|
| | White Paint-1 | White Paint-2 | White Paint-3 | White Paint-4 | White Paint-5 |
| Kind and amount of urethane acrylate oligomer blended | UA-A 36.0 parts by weight | UA-A 36.0 parts by weight | UA-A 36.0 parts by weight | UA-B 36.0 parts by weight | UA-C 36.0 parts by weight |
| Kind and amount of diluting monomer blended | Actilane 430*4 14.0 parts by weight N-vinylacetamide 10.0 parts by weight | Actilane 430 14.0 parts by weight N-vinylcapro-lactam 10.0 parts by weight | Actilane 430 14.0 parts by weight LIGHT ACRYLATE PO-A*5 10.0 parts by weight | ARONIX M-310*6 12.0 parts by weight N-vinylformamide 12.0 parts by weight | Actilane 430 14.0 parts by weight LIGHT ACRYLATE 1,6Hx-A*7 10.0 parts by weight |
| Amount of titanium oxide (CR-90*1) blended | 40.0 parts by weight | 40.0 parts by weight | 40.0 parts by weight | 40.0 parts by weight | 40.0 parts by weight |
| Amount of dispersant (FLOWLEN G-700*2) blended | 0.4 parts by weight | 0.4 parts by weight | 0.4 parts by weight | 0.4 parts by weight | 0.4 parts by weight |
| Amount of defoaming agent (FLOWLEN AC-326F*3) blended | 0.6 parts by weight | 0.6 parts by weight | 0.6 parts by weight | 0.6 parts by weight | 0.6 parts by weight |

| | Kind and Composition of White Coating Materials | | | | |
|---|---|---|---|---|---|
| | White Paint-6 | White Paint-7 | White Paint-8 | White Paint-9 | White Paint-10 |
| Kind and amount of urethane acrylate oligomer blended | UA-D 30.0 parts by weight | UA-E 40.0 parts by weight | UA-F 36.0 parts by weight | UA-G 30.0 parts by weight | UA-H 36.0 parts by weight |
| Kind and amount of diluting monomer blended | Actilane 432*8 20.0 parts by weight N-vinyl-pyrrolidone 10.0 parts by weight | Actilane 430 10.0 parts by weight N-vinylformamide 10.0 parts by weight | LIGHT ACRYLATE TMP-A*9 14.0 parts by weight N-vinylacetamide 10.0 parts by weight | ARONIX M-310 15.0 parts by weight LIGHT ACRYLATE PO-A 10.0 parts by weight EB7100*10 5.0 parts by weight | Actilane 432 12.0 parts by weight LIGHT ACRYLATE THF-A*11 12.0 parts by weight |
| Amount of titanium oxide (CR-90) blended | 40.0 parts by weight | 40.0 parts by weight | 40.0 parts by weight | 40.0 parts by weight | 40.0 parts by weight |
| Amount of dispersant (FLOWLEN G-700) blended | 0.4 parts by weight | 0.4 parts by weight | 0.4 parts by weight | 0.4 parts by weight | 0.4 parts by weight |
| Amount of defoaming agent (FLOWLEN AC-326F) blended | 0.6 parts by weight | 0.6 parts by weight | 0.6 parts by weight | 0.6 parts by weight | 0.6 parts by weight |

| | Kind and Composition of White Coating Materials | |
|---|---|---|
| | Comparative White | Comparative White |

TABLE 3-continued

Composition of Various White Coating Materials

| | White Paint-11 | White Paint-12 | White Paint-13 | Paint-1 | Paint-2 |
|---|---|---|---|---|---|
| Kind and amount of urethane acrylate oligomer blended | UA-I 36.0 parts by weight | UA-J 36.0 parts by weight | UA-K 36.0 parts by weight | Comparative UA-A 36.0 parts by weight | Comparative UA-B 36.0 parts by weight |
| Kind and amount of diluting monomer blended | LIGHT ACRYLATE TMP-A 6.0 parts by weight LIGHT ACRYLATE 3EG-A[*12] 9.0 parts by weight N-vinyl-pyrrolidone 9.0 parts by weight | ARONIX M-310 11.0 parts by weight TPGDA[*13] 11.0 parts by weight EB7100 2.0 parts by weight | LIGHT ACRYLATE TMP-A 12.0 parts by weight N-vinyl-caprolactam 12.0 parts by weight | LIGHT ACRYLATE TMP-A 12.0 parts by weight LIGHT ACRYLATE PO-A 12.0 parts by weight | ARONIX M-310 12.0 parts by weight LIGHT ACRYLATE THF-A 12.0 parts by weight |
| Amount of titanium oxide (CR-90) blended | 40.0 parts by weight | 40.0 parts by weight | 40.0 parts by weight | 40.0 parts by weight | 40.0 parts by weight |
| Amount of dispersant (FLOWLEN G-700) blended | 0.4 parts by weight | 0.4 parts by weight | 0.4 parts by weight | 0.4 parts by weight | 0.4 parts by weight |
| Amount of defoaming agent (FLOWLEN AC-326F) blended | 0.6 parts by weight | 0.6 parts by weight | 0.6 parts by weight | 0.6 parts by weight | 0.6 parts by weight |

[*1]: trade name, produced by Ishihara Sangyo Kaisha, Ltd.,
[*2]: trade name, produced by Kyoeisha Chemical Co., Ltd.
[*3]: trade name, produced by Kyoeisha Chemical Co., Ltd.
[*4]: trade name, produced by AKCROS CHEMICALS, ethylene oxide-modified trimethylolpropane triacrylate
[*5]: trade name, produced by Kyoeisha Chemical Co., Ltd., phenoxyethyl acrylate
[*6]: trade name, produced by Toagosei Co., Ltd., propylene oxide-modified trimethylolpropane triacrylate
[*7]: trade name, produced by Kyoeisha Chemical Co., Ltd., 1,6-hexanediol diacrylate
[*8]: trade name, produced by AKCROS CHEMICALS, propylene oxide-modified glycerin triacrylate
[*9]: trade name, produced by Kyoeisha Chemical Co., Ltd., trimethylolpropane triacrylate
[*10]: trade name, produced by Daicel-UCB Co., Ltd., amine-modified polyester acrylate
[*11]: trade name, produced by Kyoeisha Chemical Co., Ltd., tetrahydrofurfuryl acrylate
[*12]: trade name, produced by Kyoeisha Chemical Co., Ltd., triethylene glycol diacrylate
[*13]: trade name, produced by Daicel-UCB Co., Ltd., tripropylene glycol diacrylate Preparation of Photopolymerization Initiator Solution Photopolymerization Initiator Solutions (PI-1 to PI-6) each was prepared to have the composition shown in Table 4 below using a cationic dye, a quaternary borate-type compound, an ultraviolet radical photopolymerization initiator and N-methyl-2-pyrrolidone.

TABLE 4

Composition of Photopolymerization Initiator Solution

| Kind of Photopolymerization Initiator Solution | Kind and Amount of Photopolymerization Initiator Components Blended | | | Amount of N-Methyl-2-Pyrrolidone Blended |
|---|---|---|---|---|
| | Cationic Dye ($D^+ \cdot A_1^-$) | Quaternary Borate-Type Compound | Ultraviolet Radical Photopolymerization Initiator | |
| PI-1 | Table 1, No. 3 0.3 parts by weight | tetra-n-butylammonium n-butyl-triphenylborate 10.0 parts by weight | — | 89.7 parts by weight |
| PI-2 | Table 1, No. 4 0.4 parts by weight | tetra-n-butylammonium n-butyl-tri(4-tert-butylphenyl)borate 8.0 parts by weight | — | 91.6 parts by weight |
| PI-3 | Table 1, No. 6 0.3 parts by weight | tetra-n-butylammonium n-butyl-tri(1-naphthyl)borate 5.0 parts by weight | Darocur 1173[*1] 45.0 parts by weight | 49.7 parts by weight |
| PI-4 | Table 1, No. 5 0.5 parts by weight | tetra-n-butylammonium n-butyl-triphenylborate 10.0 parts by weight | Irgacure 651[*2] 45.0 parts by weight | 44.5 parts by weight |
| PI-5 | Table 1, No. 7 0.7 parts by weight | tetra-n-butylammonium n-butyl-tri[1-(4-methylnaphthyl)]borate 7.0 parts by weight | Irgacure 1800[*3] 55.0 parts by weight | 37.3 parts by weight |
| PI-6 | Table 1, No. 9 0.5 parts by weight | tetra-n-butylammonium n-butyl-tri(1-naphthyl)borate 6.0 parts by weight | Darocur 1173 45.0 parts by weight Lucirin TPO[*4] 8.0 parts by weight | 40.5 parts by weight |

[*1]: trade name, produced by Ciba Specialty Chemicals, 2-hydroxy-2-methyl-1-phenylpropan-1-one

TABLE 4-continued

Composition of Photopolymerization Initiator Solution

| Kind of Photo-polymerization Initiator Solution | Kind and Amount of Photopolymerization Initiator Components Blended | | | Amount of N-Methyl-2-Pyrrolidone Blended |
|---|---|---|---|---|
| | Cationic Dye (D⁺•A₁⁻) | Quaternary Borate-Type Compound | Ultraviolet Radical Photopolymerization Initiator | |

[*2]: trade name, produced by Ciba Specialty Chemicals, benzyldimethyl ketal
[*3]: trade name, produced by Ciba Specialty Chemicals, a 3:1 mixture of 1-hydroxycyclohexyl phenyl ketone and bis (2,6-dimethoxybenzoyl)-2,4,4-trimethylpentylphosphine oxide
[*4]: trade name, produced by BASF, 2,4,6-trimethylbenzoyldiphenylphosphine oxide

Photocurability Test

Respective white coating materials and respective photopolymerization initiator solutions were combined as shown in Table 5 below and the photocurability was tested.

Curing Method 1

Photocurable compositions of Examples 1 to 4 and Comparative Examples 1 and 2 comprising a combination of a white coating material and a photopolymerization initiator solution shown in Table 5 each was coated by a #30 bar coater on an aluminum plate (size: 150×70 mm) with a 200 μm-thick spacer at both edges to have a cured thickness of about 150 μm. Thereafter, a 30 μm-thick PET film was covered on the coating while preventing air therebetween and then, the composition was photocured using a metal halide lamp (UVL-6000M2-N1, manufactured by Ushio Inc., input electric power: 120 W/cm). The metal halide lamp was integrated into a belt conveyor-type light irradiation device (UVC-5033, manufactured by Ushio Inc.), the distance between the metal halide lamp and the coating was 25 cm, the belt conveyor was run at a speed of 4.2 m/min, and the light was irradiated once or twice. The intensity of light irradiated was measured with an integrating photometer UIT-102 (photoreceptor: UVD-365PD) manufactured by Ushio Inc. and was found to be 0.5 J/cm² with one irradiation and 1.0 J/cm² with two irradiations.

Curing Method 2

Photocurable compositions of Examples 5 to 17 and Comparative Examples 3 to 6 comprising a combination of a white coating material and a photopolymerization initiator solution shown in Table 5 each was coated using an applicator on an aluminum plate (size: 150×70 mm) in a thickness of about 50, 100 or 150 μm, and then photocured in air in the same manner as in the Curing Method 1 using a metal halide lamp (UVL-6000M2-N1, manufactured by Ushio Inc., input electric power: 120 W/cm). The light was irradiated once (0.5 J/cm²) or twice (1.0 J/cm²)

Evaluation Method of Coated Film

Set to Touch

Each coated film of Examples 1 to 17 and Comparative Examples 1 to 6 was peeled off from the aluminum plate and the curing state on the front and back surfaces of the coated film was evaluated in terms of the set to touch according to the evaluation method in "JIS K-5400 (Testing Method for Coating Materials in General), 6.5 Drying Time".

MEK Rubbing Test

After each cured film of Examples 1 to 17 and Comparative Examples 1 to 6 was peeled from the aluminum plate, a few drops of methyl ethyl ketone (MEK) were dropped on both the front surface side and the back surface side of the cured film and rubbed with KIMWIPE (trade name, produced by CRECIA Corporation) 20 times. The change of the film after the rubbing was visually evaluated.

TABLE 5

Results of Photocurability Test

| | Kind and Amount of White Paint Blended (parts by weight) | Kind and Amount of Photopolymerization Initiator Solution Blended (parts by weight) | Thickness of Coated Film (μm) | Results of Curability Test, Set to Dry[*1]/MEK Rubbing Test[*2*] | | | |
|---|---|---|---|---|---|---|---|
| | | | | Intensity of Light Irradiated and Curability on the Coated Film Front Surface Side | | Intensity of Light Irradiated and Curability on the Coated Film Back Surface Side | |
| | | | | 0.5 J/cm² | 1.0 J/cm² | 0.5 J/cm² | 1.0 J/cm² |
| Example 1 | White Paint-1 100 | PI-1 4.0 | 150 | A/o | A/o | A/o | A/o |
| Example 2 | White Paint-2 100 | PI-1 4.0 | 150 | A/o | A/o | A/o | A/o |
| Example 3 | White Paint-3 100 | PI-2 4.0 | 150 | B/x | A/o | B/x | A/o |
| Example 4 | White Paint-4 100 | PI-2 4.0 | 150 | A/o | A/o | A/o | A/o |
| Example 5 | White Paint-1 100 | PI-3 4.0 | 50 | A/o | A/o | A/o | A/o |
| | | | 100 | A/o | A/o | A/o | A/o |
| | | | 150 | A/o | A/o | A/o | A/o |
| Example 6 | White Paint-2 100 | PI-3 4.0 | 50 | A/o | A/o | A/o | A/o |
| | | | 100 | A/o | A/o | A/o | A/o |
| | | | 150 | A/o | A/o | A/o | A/o |

TABLE 5-continued

Results of Photocurability Test

| | Kind and Amount of White Paint Blended (parts by weight) | Kind and Amount of Photopolymerization Initiator Solution Blended (parts by weight) | Thickness of Coated Film (μm) | Results of Curability Test, Set to Dry[*1]/MEK Rubbing Test[*2] | | | |
|---|---|---|---|---|---|---|---|
| | | | | Intensity of Light Irradiated and Curability on the Coated Film Front Surface Side | | Intensity of Light Irradiated and Curability on the Coated Film Back Surface Side | |
| | | | | 0.5 J/cm² | 1.0 J/cm² | 0.5 J/cm² | 1.0 J/cm² |
| Example 7 | White Paint-3 100 | PI-3 4.0 | 50 | C/x | A/o | B/x | A/o |
| | | | 100 | C/x | A/o | B/x | A/o |
| | | | 150 | C/x | A/o | C/x | A/o |
| Example 8 | White Paint-4 100 | PI-4 4.0 | 50 | A/o | A/o | A/o | A/o |
| | | | 100 | A/o | A/o | B/x | A/o |
| | | | 150 | A/o | A/o | B/x | A/x |
| Example 9 | White Paint-5 100 | PI-4 4.0 | 50 | C/x | A/o | B/x | A/o |
| | | | 100 | C/x | A/o | C/x | A/x |
| | | | 150 | C/x | A/o | C/x | B/x |
| Example 10 | White Paint-6 100 | PI-4 4.0 | 50 | A/o | A/o | A/o | A/o |
| | | | 100 | A/o | A/o | B/x | A/o |
| | | | 150 | A/o | A/o | B/x | A/x |
| Example 11 | White Paint-7 100 | PI-4 4.0 | 50 | A/o | A/o | A/o | A/o |
| | | | 100 | A/o | A/o | B/x | A/o |
| | | | 150 | A/o | A/o | B/x | A/x |
| Example 12 | White Paint-8 100 | PI-5 4.0 | 50 | A/o | A/o | A/o | A/o |
| | | | 100 | A/o | A/o | A/o | A/o |
| | | | 150 | A/o | A/o | A/o | A/o |
| Example 13 | White Paint-9 100 | PI-5 4.0 | 50 | A/o | A/o | A/o | A/o |
| | | | 100 | A/o | A/o | B/x | A/o |
| | | | 150 | A/o | A/o | B/x | A/o |
| Example 14 | White Paint-10 100 | PI-5 4.0 | 50 | A/o | A/o | A/x | A/o |
| | | | 100 | A/o | A/o | B/x | A/o |
| | | | 150 | A/o | A/o | C/x | A/o |
| Example 15 | White Paint-11 100 | PI-6 4.0 | 50 | A/o | A/o | A/o | A/o |
| | | | 100 | A/o | A/o | A/o | A/o |
| | | | 150 | A/o | A/o | A/o | A/o |
| Example 16 | White Paint-12 100 | PI-6 4.0 | 50 | A/o | A/o | B/x | A/o |
| | | | 100 | A/o | A/o | B/x | A/o |
| | | | 150 | A/o | A/o | C/x | A/o |
| Example 17 | White Paint-13 100 | PI-6 4.0 | 50 | A/o | A/o | A/o | A/o |
| | | | 100 | A/o | A/o | A/o | A/o |
| | | | 150 | A/o | A/o | A/o | A/o |
| Comparative Example 1 | Comparative White Paint-1 100 | PI-1 4.0 | 150 | D/x | B/x | D/x | B/x |
| Comparative Example 2 | Comparative White Paint-2 100 | PI-2 4.0 | 150 | D/x | B/x | D/x | B/x |
| Comparative Example 3 | Comparative White Paint-1, 100 | PI-3 4.0 | 50 | D/x | B/x | C/x | A/x |
| | | | 100 | D/x | B/x | D/x | B/x |
| | | | 150 | D/x | B/x | D/x | B/x |
| Comparative Example 4 | Comparative White Paint-2, 100 | PI-4 4.0 | 50 | D/x | B/x | C/x | A/x |
| | | | 100 | D/x | B/x | D/x | B/x |
| | | | 150 | D/x | B/x | D/x | B/x |
| Comparative Example 5 | Comparative White Paint-1, 100 | PI-5 4.0 | 50 | D/x | B/x | B/x | A/x |
| | | | 100 | D/x | B/x | C/x | B/x |
| | | | 150 | D/x | B/x | D/x | B/x |
| Comparative Example 6 | Comparative White Paint-2, 100 | PI-6 4.0 | 50 | D/x | B/x | B/x | A/x |
| | | | 100 | D/x | B/x | C/x | A/x |
| | | | 150 | D/x | B/x | D/x | B/x |

[*1]: In the evaluation of set to dry, the degree of curing was rated by the following 4 ranks:
A: When the center of the film was rapidly and repeatedly rubbed with a fingertip, the film was not scratched.
B: When the center of the film was gently rubbed with a fingertip, the film was not scratched.
C: When the center of the film was lightly touched with a fingertip, the fingertip was not stained.
D: When the center of the film was lightly touched with a fingertip, the paint adhered to the fingertip.
[*2]: The evaluation in the MEK (methyl ethyl ketone) rubbing test was made by the following 2 ranks:
o: When a few drops of MEK were dropped on the film and KIMWIPE (trade name, produced by CRECIA Corporation) was moved back and forth 20 times, no change was observed on the film.
x: When a few drops of MEK were dropped on the film and KIMWIPE was moved back and forth 20 times, the film underwent changes such as disappearance of gloss.

It is apparently seen from the results in Table 5 that by using a urethane (meth)acrylate oligomer synthesized from a polyisocyanate having three or more isocyanate groups within one molecule and a hydroxyl group-containing (meth)acrylic acid ester, the composition having high hiding power can be completely photocured to have a sufficiently large thickness, with a photopolymerization initiator comprising a cationic dye/a quaternary borate-type compound.

The photocurable composition of the present invention, comprising a urethane (meth)acrylate oligomer obtained by reacting a polyisocyanate having three or more isocyanate groups within one molecule with a hydroxyl group-containing (meth)acrylic acid ester, a cationic dye represented by formula (1) and a quaternary borate-type compound represented by formula (2) exhibits very high curability even when the composition contains a pigment or color dye having high hiding power. Accordingly, the photocurable composition of the present invention can be advantageously used in the field of coating materials, adhesives, pressure-sensitive adhesives, inks, hologram materials and the like.

While the invention has been described in detail and with reference to specific embodiments thereof, it will be apparent to one skilled in the art that various changes and modifications can be made therein without departing from the spirit and scope thereof.

What is claimed is:

1. A photocurable composition comprising:
   (A) 100 parts by weight of a compound having an ethylenically unsaturated group,
   (B) from 0.001 to 5 parts by weight of a cationic dye having an absportion maximum wavelength in the wavelength region of from 400 to 1,200 nm, represented by formula (1):

wherein $D^+$ represents a cation having an absorption maximum wavelength in the wavelength region of from 400 to 1,200 nm, and $A_1^-$ represents an anion, and
   (C) from 0.005 to 10 parts by weight of a quaternary borate compound represented by formula (2):

wherein $R_1$, $R_2$, $R_3$ and $R_4$ each independently represents an alkyl group, an aryl group, an aralkyl group, an alkenyl group, an alkynyl group, a silyl group, a heterocyclic group or a halogen atom, and $Z^+$ represents a cation, wherein from 5 to 95 wt % of (A) the compound having an ethylenically unsaturated group is a urethane (meth)acrylate oligomer obtained by the reaction of a polyisocyanate having three or more isocyanate groups within one molecule with a hydroxyl group-containing (meth)acrylic acid ester.

2. The photocurable composition as claimed in claim 1, wherein from 3 to 40 wt % of the compound having an ethylenically unsaturated group is an N-vinylamide compound.

3. The photocurable composition as claimed in claim 2, wherein the N-vinylamide compound is one or more compounds selected from the group consisting of N-vinylformamide, N-vinylacetamide and N-methyl-N-vinylacetamide.

4. The photocurable composition as claimed in any one of claims 1 to 3, wherein the cation $D^+$ having an absorption in the region of from 400 to 1,200 nm is one or more compounds selected from the group consisting of polymethine, xanthene, acridine, azine, oxazine, thiazine, diarylmethane and triarylmethane compounds.

5. The photocurable composition as claimed in claim 4, wherein the polymethine compound is a compound represented by formula (3):

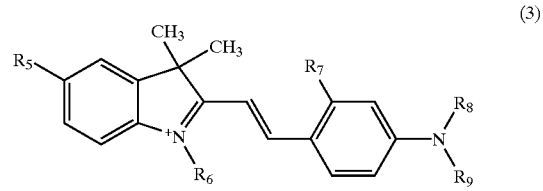

wherein $R_5$, $R_6$, $R_7$, $R_8$ and $R_9$ each independently represents a hydrogen atom, an alkyl group, an aryl group or a halogen atom.

6. The photocurable composition as claimed in any one of claims 1 to 3, which further contains from 0.1 to 10 parts by weight of an ultraviolet radical photopolymerization initiator capable of generating a radical by absorbing light at a wavelength of from 200 to 400 nm.

7. The photocurable composition as claimed in any one of claims 1 to 3, wherein the polyisocyanate having three or more isocyanate groups within one molecule is one or more compounds selected from the group consisting of an isocyanurate form of diisocyanate, a biuret form of diisocyanate and an adduct form of diisocyanate with a polyol.

8. The photocurable composition as claimed in claim 7, wherein the diisocyanate is one or more compounds selected from the group consisting of an aliphatic diisocyanate and an alicyclic diisocyanate.

9. The photocurable composition as claimed in any one of claims 1 to 3, wherein the polyisocyanate having three or more isocyanate groups within one molecule is a triisocyanate monomer.

10. The photocurable composition according to claim 7, wherein the isocyanurate form of diisocyanate is represented by formula (4):

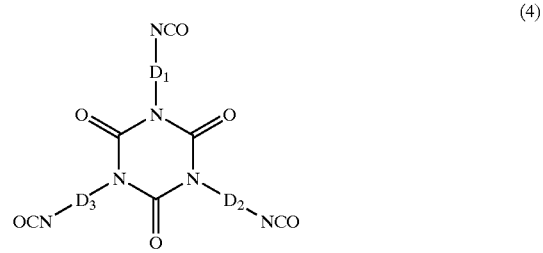

wherein $D_1$, $D_2$ and $D_3$ each represents an organic group which does not have a substituent that can react with an isocyanate group.

11. The photocurable composition according to claim 7, wherein the biuret form of diisocyanate is represented by formula (5):

(5)

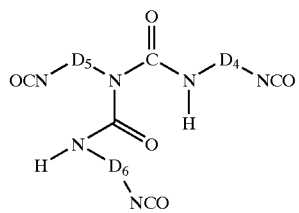

wherein $D_4$, $D_5$ and $D_6$ each independently represents an organic group which does not have a substituent that can react with an isocyanate group.

12. The photocurable composition according to claim 7, wherein the adduct form of a diisocyanate is represented by formula (6) or (7):

(6)

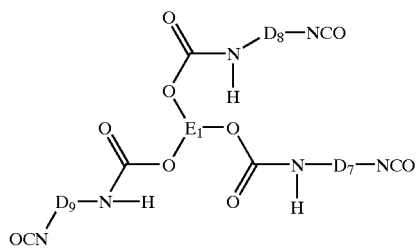

(7)

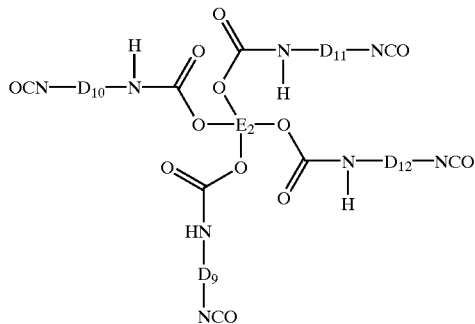

wherein $D_7$, $D_8$, $D_9$, $D_{10}$, $D_{11}$ and $D_{12}$ each independently represents an organic group which does not have a substituent that can react with an isocyanate group, $E_1$ represents a trivalent organic group having from 3 to 10 carbon atoms, and $E_2$ represents a tetravalent organic group having 3 to 10 carbon atoms.

* * * * *